United States Patent Office 3,094,494
Patented June 18, 1963

3,094,494
IMPROVED ION EXCHANGE CELLULAR PRODUCTS
Robert P. Hopkins, Ardsley, Pa., and William C. Scudder, Haddonfield, N.J., assignors to Rohm & Haas Company, Philadelphia, Pa., a corporation of Delaware
No Drawing. Filed Jan. 26, 1959, Ser. No. 788,780
10 Claims. (Cl. 260—2.1)

This invention relates to improved foamed plastic products having ion exchange properties. The present invention is a continuation-in-part of our patent application Serial No. 727,557, Ion Exchange Products and Methods for Making and Using Them, filed April 10, 1958, now U.S. Patent No. 3,024,207. An aspect of that application relates to cellular poly(ester-urethane) materials in which there are incorporated ion exchange resins. The resins are present in an amount from 20 to 150 parts by weight per 100 parts by weight of matrix-forming polymeric material other than the ion exchange resin.

To further improve the structure of these poly(ester-urethane) ion exchange foams the preparation of the polyester was carried out with polyols of a higher order of reactivity. As a result, improved cross-linking was obtained in the poly(ester-urethane) for foaming into a matrix, but the viscosity of the polyester approached a point whereby the addition of large amounts of ion exchange resins introduced practical manufacturing difficulties.

In accordance with the instant invention, there was discovered a special class of ion exchange foams which may be manufactured efficiently and which possess excellent cellular structure. This special class of ion exchange foams are foamed poly(ether-urethanes) containing synthetic ion exchange resins in an amount from 0.5 to 160 parts by weight per 100 parts by weight of poly(ether-urethane) polymeric matrix other than the ion exchange resin, said poly(ether-urethanes) being derived from polyethers having a hydroxyl functionality of at least 2.0. The products of this invention are characterized by good porosity and by high ion exchange capacity when considered in terms of the amount of ion exchange resins employed.

An unexpected aspect of this invention is the fact that these polyethers are especially well-suited in solving the problems which are peculiar to this new field of ion exchange cellular foams. One problem which these polyethers have gone a long way in resolving is the problem of undesirable high viscosity which was encountered upon addition of ion exchange resins to the polyesters for foaming. Unlike the polyesters, these polyethers admit the integration of the necessary ion exchange resins while still retaining adequate fluidity. Moreover, another unexpected facet of this invention is that these polyethers, again unlike polyesters, have even a greater capacity for the ion exchange resins on the basis of the weight of the polyether. This, of course, is a very valuable advantage since it provides ion exchange foams having greater ion exchange capacity on a weight basis.

The present ion exchange foams may contain ion exchange resins in an amount as low as 0.5 to as high as 160 parts by weight per 100 parts by weight of foamed matrix, other than the ion exchange resin. The products which contain from about 0.5 to about 15 parts by weight of ion exchange resin per 100 parts of the matrix form an especially desirable group since they are well-suited for applications where a comparatively low but gradual and sustained order of ion exchange rate is desired. For general applications, ion exchange foams containing 20 to 60 parts by weight of ion exchange resin per 100 parts by weight of the matrix are preferred.

Another problem peculiar to this new field of ion exchange foams which the present products greatly contribute in solving is resistance to hydrolysis by alkali and acid which the products of this invention exhibit to a much greater degree than poly(ester-urethane) foams. This, of course, becomes very important in the regeneration of the spent ion exchange sponges. Yet, another advantageous aspect of the products of this invention is their greater rate of exchange by virtue of their hydrophilicity which much exceeds that of ion exchange foams made with polyesters. Actually, this combination of hydrophilicity and resistance to hydrolysis in base or alkali is surprising since it would be expected that resistance to hydrolysis would tend to increase with increasing hydrophobicity. A further advantage is that the products of this invention exhibit a greater stability to moist heat than products prepared with poly(ester-urethane) matrixes. This stability is especially valuable in pharmaceutical, medical, biological, and similar applications, wherever it is necessary to sterilize the ion exchange foam products of this invention.

In combination with these valuable aspects, the ion exchange cellular products of this invention provide a solidified continuous form of ion exchange material with a wide range of mechanical properties including flexibility adapting the material to dynamic ion exchange applications, as well as the conventional static ion exchange applications. The ability to flex the product repeatedly adds a new factor to favor the achievement of efficient ion exchange and effective regeneration. The products of this invention are further characterized by a low density up to but not exceeding 20 pounds per cubic foot. The products may be of the open-cell or interconnecting flexible type. In using the flexible types, they may be disposed in a body of the liquid from which ions are to be removed, which body may be stationary (in which event the ion exchange article is desirably moved with respect to the body of liquid to provide the best contact between the ion exchange resin and the ions in the liquid with which contact would otherwise depend to a great extent on diffusion), but is preferably a moving stream passing continuously, and possibly repeatedly by recycling, through the article. The flexible products can be used in yet another manner which involves alternate compressing and releasing of the compression of the product while it is disposed in a body of the liquid, which may be stationary or moving. Also, the products of this invention may be employed in non-aqueous media where similar advantage may be taken from their flexibility and porosity combined with their ion exchange properties.

The polyesters which are so remarkably suited for forming the matrix of the products of this invention are polyoxyalkylene glycol polymers. The polyoxyalkylene glycols used in this invention have hydroxyl polyfunctionality. Their minimum number of hydroxyl groups is 2; preferably the upper range does not exceed 6. Polyoxyalkylene glycols of a functionality of 3 to 4, and especially of 4, form a desirable group because of their high order of reactivity in forming a suitable matrix for the products of this invention. Blends of different polyoxyalkylene glycols of the same or different functionality may be prepared to suit the individual requirements by adjustments to the respective proportions of the polyoxyalkylene glycols. Alternatively, the polyoxyalkylene glycols of the desired functionality may be prepared by selection of the suitable reactants. Accordingly, there may be employed for forming the polymeric matrix of intercommunicating or open cells of the instant products any polyoxyalkylene glycol of a functionality in the range of 2 to 6, or higher, which is reactable with organic polyisocyanate, water, and, if necessary, a suitable catalyst, and which upon timely incorporation of the ion exchange resins, forms the products of this invention.

Suitable polyethers for use in forming the matrix of the instant products are known. In a general manner, they are obtainable from the reaction of alkylene oxides and a material containing at least two reactive hydrogen atoms which initiate the polymerization of the alkylene oxide. Since the reactive hydrogen-containing compound constitutes only a small proportion of the high molecular weight polyoxyalkylene compounds, it does not ordinarily have any influence on the properties thereof. Accordingly, the particular active hydrogen-containing compound employed in preparing the polyoxyalkylene compounds for use in this invention is not critical, providing it furnishes at least two reactive hydrogen atoms and generally suitable polyoxyalkylene compounds are obtainable regardless of the particular hydrogen-containing compound employed in the preparation of the polyoxyalkylene polymer.

The term "reactive hydrogen atom" which is used herein in connection with the hydrogen-containing compound is well-known and clearly understood by those skilled in the art. The term "reactive hydrogen atom" includes an hydrogen atom which reacts with methyl magnesium iodide to liberate methane in the classical Zerewitinoff reaction (see Niederl and Niederl, Micromethods of Quantitative Organic Analysis, page 263, John Wiley and Sons, New York city, 1946).

The reactive hydrogen atoms which fulfill the above condition are normally activated by being a member of a functional group containing an oxygen atom such as a hydroxyl group, a phenol group, a carboxylic group; a basic nitrogen atom, for instance, an amine group, a hydrazine group, an imine group, an amide group, a guanidine group, a sulfonamide group, a urea group, a thiourea group; or a functional group containing a sulfur atom, such as a mercaptan, a thiophenol, a thiocarboxylic acid, hydrogen sulfide, and the like. Alternatively, certain hydrogen atoms may be activated by proximity to carboxyl groups, such as those found in cyanoacetic esters, acetoacetic esters, malonic esters, and the like. Illustrative examples of reactive hydrogen atom-containing compounds which may be used in preparing polyoxyalkylene polymers useful in this invention are ethylene glycol, 1,3-butylene glycol, glycerol, pentaerythritol, oxalic acid, triethanolamine, butylamine, aniline, resorcinol, glucamine, sorbitol, octabis(hydroxypropyl)sucrose, and triethyl malonate. Other useful compounds are further illustrated below.

The preparation of suitable polyoxyalkylene polymers from suitable reactive hydrogen atom-containing compounds is carried out by condensing a suitable alkylene oxide, such as propylene oxide or ethylene oxide, with the reactive hydrogen compound at elevated temperatures and pressures, normally in the presence of an alkaline catalyst, such as sodium alkoxide, a quaternary ammonium base or sodium hydroxide. Similarly, the condensation reaction may be carried out in the presence of acid catalysts as set forth in U.S. Patent 2,510,540. Suitable alkylene oxides are ethylene oxide, propylene oxide, butylene oxide, hexadecylene oxide, glycide, styrene oxide, picoline oxide, or methyl glycide. Modifications in the physical characteristics of the products are obtainable by suitable adjustments of the number of units of alkylene oxide, the selection of particular alkylene oxide, and when more than one type of alkylene oxide is employed, the order of reaction of the alkylene oxides with the reactive hydrogen atom-containing compound.

The polyethers resulting from the reaction of such reaction of such reactive hydrogen atom-containing compounds and suitable alkylene oxides may have molecular weights varying over a wide range, extending approximately from 600 to 9000. When the starting polyethers have a molecular weight below 600 or above 9000, they may not have optimum physical properties or the final structure of the foam may fall short of highest expectations. However, if these facts may be overlooked, polyethers even outside of the 600 to 9000 range may be employed. Presently, within this range, we tend to prefer polyethers having a molecular weight in the lower portion of the range, such as from about 1200 to 2500, when the polyethers used have a functionality in the lower portion of the 2-to 6 range. As we use polyethers of increasing functionality and approaching the upper portion of the range, we tend to favor correspondingly higher molecular weight ranges, such as from about 3400 to 6500, preferably within the 4500 to 5400 range. When it is desired to use polyethers of a functionality over 6.0, their molecular weight may be correspondingly higher. For best results, another consideration should influence the choice of polyethers; namely, it is preferred to use polyethers which are fluid or of a viscous nature at the time and the condition causing the initiation of the liberation of gas as a result of the polyisocyanate reaction. In this manner, the polyethers are fluid enough to allow for expansion of the gas. This viscosity also permits convenient incorporation of the ion exchange resin into the reactants forming the matrix. The viscosity of polyethers may be measured in terms of centipoises, as measured on a Brookfield Viscometer, and may range from 5000 to 50,000, more especially in the range of 5000 to 10,000 centipoises. When the polyethers have a viscosity exceeding the desired limit, as when they are too pasty or when they are solids, such as flakes, it is desirable to modify the polyethers to the extent necessary till they assume the favored consistency. Any suitable means to achieve these ends may be employed as, for instance, heating the polyethers till they assume more desirable physical characteristics, or addition of viscosity-reducing aids, such as plasticizers, or other viscosity-reducing liquids compatible with the foam system. Examples thereof are diallyl phthalates, diallyl sebacates, tris($\beta$-chloroethyl)phosphates, dricresyl phosphates, and the like. Generally the viscosity of the polyethers is determined by the nature and/or order of reaction of the particular alkylene oxides which are reacted with the reactive hydrogen-containing compounds. Generally, when ethylene oxide is reacted last with the reactive hydrogen-containing compound, the viscosity of the polyether tends to increase with the number of terminal units of ethylene oxide. Polyethers in which there are no terminal ethylene units to those having about 15 or even 16 units of terminal ethylene oxide per mole of reactive hydrogen atoms are generally of the desired viscosity without requiring further modification for reaction with the polyisocyanates. When the polyethers are considered as polymers having a hydrophobic base of the reactive hydrogen compound and any alkylene oxide and a hydrophilic portion of ethylene oxide units, those having the desired viscosity may have as much as 65 percent, generally in the range of 10 to 50%, oxyethylene units on the average molecular weight of the hydrophobic base.

A large number of polyethers useful as starting materials to form the matrix of the products of this invention are available and described in the literature. Illustrations thereof are U.S. Patent Nos. 2,734,045; 2,425,845; 2,846,416; 2,726,219; 2,808,390; 2,853,472; and U.K. Patent No. 803,544. Also useful are block polymers which may be described by formula

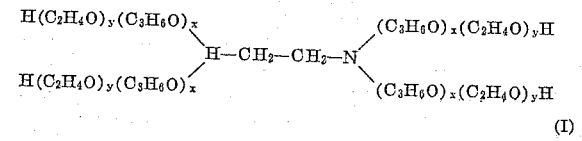

(I)

where the average values of the subscripts may be as follows:

$a = 1$ to 6,
$b = 12$ to 40,
$c = 1$ to 6,
$x = 7$ to 19, and
$y = 1$ to 3.

These polyethers may be prepared by the sequential addition of propylene and ethylene oxides to ethylenediamine as the starting nucleus. Instead of ethylenediamine, there may be used as starting nucleus other suitable reactive hydrogen-containing compounds of the type discussed above. Another illustrative group of reactive hydrogen atom-containing compounds for forming useful polyethers are polyalkylenepolyamines having the structural formula $$NH_2(RNH)_zH \quad (II)$$

where R is an alkylene radical or a hydrocarbon substituted alkylene radical, and $z$ is an integer greater than 1, there being no upper limit of the number of alkylene groups in the molecule. In this type of compound which has at least one nitrogen atom and at least one reactive hydrogen atom attached to a nitrogen atom, it is preferred to use polyalkylenepolyamines having the formula $$H_2N(C_2H_4NH)_zH \quad (III)$$

wherein $z$ is an integer varying from about 2 to about 6. Nonlimiting examples of such useful polyamine reactants are diethylenetriamine, triethylenetetramine, tetraethylenepentamine, pentaamylenehexamine, and numerous others, such as, for instance, those listed in U.S. Patent 2,794,782, which is included herein by reference. This group of polyfunctional polyethers has the advantage of providing polyethers of a functionality of greater than 2, and especially polyethers having a polyfunctionality of about 4, which results in ion exchange foams exhibiting superior physical and chemical properties.

Numerous other compounds containing reactive hydrogen atoms may be employed to react with the alkylene oxides. Suitable are glycols like ethylene glycol, diethylene glycol, triethylene glycol, and the like, triols like glycerol, or trimethylolpropane, pentaerythritol, resorcinol, sorbitol, aminoalcohols like triisopropanolamine, monoethanolamine, diethanolamine, and like amines disclosed in U.S. Patent 2,748,085; oxalic acid, aniline, glucamine, octabis(hydroxypropyl)sucrose, triethyl malonate. Other illustrations of polyfunctional compounds are found in U.S. Patent 2,622,070, 2,290,415, and 2,408,527, all these patents being included herein by reference.

In according with this invention, the polyether reactants for mixing with the selected ion exchange resins and for reaction with the organic polyisocyanate and water are prepared by judicious selection of polyethers having the prescribed functionality or from predetermined proportions of polyethers of different functionality. Presently, polyethers having an average functionality of about 4 are preferred because of the very satisfactory resulting ion exchange foams. Accordingly, tetrafunctional polyethers may be employed alone or polyethers of different functionality may be combined in the required proportion to yield polyethers of the desired functionality. Polyethers of functionality less than 4 may be prepared by incorporating with the tetrafunctional polyethers selected proportions of polyethers having a functionality less than four. Polyethers of a functionality higher than four are obtainable by introducing selected proportions of polyethers having a functionality greater than four. For instance, by increasing proportions of polyethers derived from $H_2N(C_2H_4NH)_6H$ and ethylene oxide, the functionality of the polyethers may be increased till it reaches six. Polyethers of functionality greater than six, which may be prepared, for instance, from polyethylenepolyamines disclosed in U.S. Patent 2,794,782 may be used in a similar manner.

For preparing the ion exchange cellular products of this invention, any type of synthetic polymeric ion exchange resin may be employed, provided it has at least a capacity of 3 milliequivalents per gram. The use of resins having appreciably lower capacity is undesirable because of the higher viscosity of the foamable composition resulting from the necessity to use a large proportion of such resins in order to achieve a given capacity in the cellular products. Preferably, the ion exchange resins are finely divided particles. The synthetic ion exchange resins that are suitable include phenol-aldehyde condensation products into which amine, quaternary ammonium, or acid groups, such as carboxylic or sulfonic acid groups, are incorporated, and the cross-linked addition polymers which contain ion exchange groups are prepared by copolymerizing from about one-half mole percent up to 30 mole percent of a polyethylenically unsaturated monomer with a monoethylenically unsaturated monomer which either contains ion exchange groups or contains groups which can be converted into ion exchange groups by later reaction in any suitable manner.

Examples of monomers containing cation-exchange groups include acrylic acid, methacrylic acid, itaconic acid, maleic acid, fumaric acid, carboxypentyl vinyl ether, sodium salt of ethylenesulfonic acid, esters of phosphonic acids, such as the methyl, ethyl, propyl, or butyl esters of vinylphosphonic acid, and the like as well as the alkali metal, ammonium or amine salts of such acids. Examples of monomers containing amino-exchange groups include aminoalkyl acrylates, methacrylates, or itaconates, e.g., β-aminoethyl acrylate, methacrylate, or itaconate di-ester, 5-aminopentyl methacrylate or itaconate di-ester, β-morpholino-ethyl acrylate, methacrylate, or itaconate diester, 3-aminopropyl acrylate, methacrylate, or itaconate diester, 2-amino-2-methylpropyl acrylate, methacrylate or itaconate di-ester, β-N-methylaminoethyl acrylate, methacrylate or itaconate di-ester, β-N,N-dimethylaminoethyl acrylate, methacrylate or itaconate di-ester; N-aminoalkyl acrylamides, methacrylamides, or itaconamides, e.g. N-β-aminoethyl acrylamide or methacrylamide, N-5-aminopentyl acrylamide or methacrylamide, N,N-di-β-aminoethyl acrylamide or methacrylamide, N,N-di-β-dimethylaminoethyl acrylamide or methacrylamide, N-β-dimethylaminoethyl acrylamide or methacrylamide, N-β-diethylaminoethyl acrylamide or methacrylamide, vinyloxyalkylamines, e.g. β-vinyloxyethylamine, dimethyl-(β-vinyloxyethyl)amine, vinylthioalkylamines, such as dimethyl-(β-vinylthioethyl)amine; quaternary ammonium compounds obtained by the alkylation of any of the amines so far mentioned by such alkylating agents (which is herein intended to include aralkylating agents and substituted aralkylating agents), such as methyl chloride, ethyl chloride, benzyl chloride, allyl chloride, substituted allyl chloride, e.g. dodecylallyl chloride, dodecenyl chlorides, alkylbenzyl chlorides, e.g., octylbenzyl chlorides (from diisobutylene), any chloromethylated aromatic-like compound, e.g. chlorobenzyl chloride, chloromethylated thiophene, chloromethylated furane, chloromethylated naphthalene, or corresponding bromides or iodides, e.g. phenoxyethyl bromide, methyl iodide; dimethyl sulfate, dimethyl sulfite, dimethyl phosphite, ethylene oxide, propylene oxide, styrene oxide, and butylene oxide. For example, a mixture of 17.9 grams (0.109 mole) of monomeric dimethylaminopropylacrylamide, 13.8 grams (0.109 mole) of benzyl chloride, 74 grams of absolute ethanol (30% solids) and di-β-naphthol were heated to reflux for two hours. The product was isolated by concentration in vacuo. Any of the quaternary ammonium monomeric compounds disclosed in applications Serial No. 441,643, filed July 6, 1954; Serial No. 461,285, filed October 8, 1954; Serial No. 495,784, filed March 21, 1955; Serial No. 495,785, filed March 21, 1955; and Serial No. 557,654, filed January 6, 1956, may be used herein and the disclosures in these applications of the quaternary ammonium monomers and their preparation are incorporated herein by reference. Examples of these quaternary compounds include (β - methacryloxyethyl)trimethylammonium hydroxide, chloride, methosulfate, bromide and so on, the dodecenyl chloride quaternary of 1-(β-dimethylaminoethyl)-3-vinyl-imidazolidinone-2 and the benzyl chloride quaternary of 1 - (β - dioctadecylaminoethyl) - 3 - vinylimidazolidinone-2, (β-acryloxyethyl)trimethylammonium chloride, hydroxide, and so on, (β-methacrylamidoethyl)triethylammonium chloride, hydroxide, and so on, (β-vinyloxyethyl)trimethylammonium chloride, hydroxide, and so on.

Examples of cross-linking agents that may be used include any copolymerizable compound which contains two or more non-conjugated points of ethylenic unsaturation or two or more non-conjugated vinylidene groups of the structure, $CH_2=C=$, such as divinyltoluene, divinylbenzene, trivinylbenzene, divinylnaphthalene, ethylene glycol diacrylate or dimethacrylate, 2-ethylhexane-1,3-dimethacrylate, divinylxylene, divinylethylbenzene, divinyl ether, divinyl sulfone, allyl ethers of polyhydric compounds such as of glycerol, pentaerythritol, sorbitol, sucrose, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitrate, triallyl citrate, triallyl phosphate, N,N' - methylenediacrylamide, N,N' - methylenedimethacrylamide, N,N'-ethylidenediacrylamide, 1,2-di(α-methylmethylenesulfonamido)-ethylene, and so on. The preparation thereof is not an essential part of the present invention. They may be prepared in known ways in granular or bead form and be of more or less porous character. The size of the resin particles employed in the present invention may be anywhere from about 0.04 mm. to 1 mm. in diameter and preferred products are obtained from those having diameters or equivalent dimensions not in excess of 0.1 mm. In many commercial operations for producing particular ion exchange resins, a massive material is comminuted. It is one of the advantages of the present invention that it can satisfactorily employ such fines obtained from the comminuting operations as would be unusable in normal ion exchange columns.

A preferred embodiment for producing the ion exchange cellular products of this invention is to incorporate the ion exchange resin particles in a mixture of a suitable polyether and polyisocyanate and subject the mixture to the conditions for producing foams of the polyether type. The organic isocyanate which may be used may be one or more of the following: ethylene diisocyanate, trimethylene diisocyanate, tetramethylene diisocyanate, pentamethylene diisocyanate, propylene-1,2-diisocyanate, butylene-1,2-diisocyanate, butylene-1,3-diisocyanate, butylene-2,3-diisocyanate, and butylene-1,3-diisothiocyanate; alkylidine diisocyanates, such as hexamethylene diisocyanate, ethylidene diisocyanate $(CH_3CH(NCO)_2)$, butylidene diisocyanate $CH_3CH_2CH_2CH(NCO)_2$, cycloalkylene diisocyanates such as cyclopentylene-1,2-diisocyanate, cyclohexylene - 1,2 - diisocyanate, cyclohexylene-1,4-diisocyanate; aromatic diisocyanates such as m-phenylene diisocyanate, p-phenylene diisocyanate, 1-methylphenylene-2,4-diisocyanate, naphthalene-1,4-diisocyanates, o,o'-toluenediisocyanate; aromatic diisocyanates such as xylylene-1,4-diisocyanate, xylylene-1,3-diisocyanate, 4,4'-diphenylenemethane diisocyanate, and 4,4'-diphenylenepropane diisocyanate, hexylisocyanate, p-phenylenediisocyanate, o-phenylenediisocyanate, methylene-bis(4-phenylisocyanate), 1-chloro-2,4-phenylenediisocyanate, diphenyl-3,3'-dimethyl-4,4'-diisocyanate, diphenyl-3,3'-dimethoxy-4,4'-diisocyanate, 1,3-phenylenediisocyanate, p-dixylyl methane-4,4'-diisocyanate, 4,4',4''-triphenylmethane triisocyanate, benzene-1,2,4-triisocyanate, triisocyanate made from p-fuchsin, also tetraisocyanate as p,p',o,o'-diphenylmethane. Toluene diisocyanates of the 2,4- and 2,6-isomeric forms are preferably employed to obtain fast reaction, but such isocyanates as diphenylmethane-4,4'-diisocyanate and p-menthanediisocyanate may be used for a slower reaction or where a more vigorous catalyst is employed. The proportion of polyisocyanate employed is sufficient to react with the hydroxyl groups of the polyoxyalkylene glycols and to provide a substantial excess of isocyanate molecules as compared with the available hydroxyls for the reaction with water to liberate the necessary gas for the final foam. Generally, the proportion of diisocyanate may be from 6% to 85% by weight, based on the weight of the particular polyether, depending on the polyisocyanate requirement. Correspondingly lesser amounts are needed when tri- and tetra-isocyanates are employed.

While it is not essential that a catalyst be present, a tertiary amine may be employed to advantage where it is desired to shorten the time of reaction. Examples of such useful amines are triethylamine, dialkylaminoalcohol, diethylcyclohexylamine, dimethyl hexadecylamine, dimethylcetylamine, pyridine, quinoline, and 3-methylisoquinoline are desirable groups. Also useful catalysts include the N-alkyl morpholines in which the alkyl substituents have from 1 to 18 carbon atoms of which N-methylmorpholine is typical, triethylamine, triethanolamine, dimethylethanolamine, N,N-diethylcyclohexylamine, and 1,4-diazabicyclo[2.2.2]octane.

Still other catalysts which may be employed comprise quaternary ammonium compounds which under conditions of reaction are adapted to decompose to liberate tertiary amines in situ. Examples of such materials are salts of tertiary amines, such as N-methylmorpholine and anhydrides of dicarboxylic acids, such as acetic acid. As much as 2% to 10% of such amines may be employed on the weight of diisocyanate.

The poly(ether-urethane) cellular ion exchange products of this invention may be obtained by merely mixing the ion exchange resin polyether mix with the polyisocyanate and water with or without the catalyst at normal room temperature up to 60° C. The time required to effect the reaction and complete it may vary from 15 seconds to several hours depending upon whether a catalyst is employed, the activity of the diisocyanate, and the temperature. The mixture of the several reactants with or without a catalyst may be placed in a mold in which it is foamed into the desired shape during the completion of the reaction. Likewise, a mixture of the reactants may be extruded continuously and, for this purpose, the several ingredients and the temperature may be controlled so as to allow adequate time for the passage of the mixture from the point of mixing into the extrusion channel before setting occurs.

In order to stabilize the foam, an emulsifier may be employed in an amount ranging from about 0.5 to 5% on the weight of the polyether. Any of the usual emulsifiers are suitable. In addition to the emulsifier, there is incorporated from 1% to 5% of water based on the weight of polyether in order to develop the necessary gas for formation of the cellular mass. In making the cellular products, the various ingredients may be mixed in different ways, depending on the resin/polyisocyanate system involved. When it is desirable to manufacture the cellular ion exchange products of the present invention from polyethers on conventional continuous production from machines, the ion exchange resin is first mixed into the polyether. An advantage of the present invention is that rarely, if ever, a viscosity-reducing aid is needed. The polyether/ion exchange resin mixture is in turn mixed with the diisocyanate and an activator mixture consisting of water and catalyst, and where necessary, an emulsifier. In order to produce the desired ion exchange products by simultaneous mixing, the polyester/ion exchange resin mixture is supplied to the mixing head from one line in the machine, the diisocyanate from another, and the activator from still another separate line.

When it is desired to make the cellular ion exchange products of the invention from what are commonly referred to in the art as "prepolymers," the polyol-containing material is first reacted with the polyisocyanate, in an amount sufficient to react with the hydroxyl groups of the polyol plus an additional amount for subsequent reaction with water to liberate the necessary gas for the final foam. The ion exchange resin is added to the "prepolymer" and followed by the catalyst-water (and emulsifier, if necessary) mixture. Finally, the mixture is introduced into a mold or fed continuously to a container on a moving conveyor, and the foam allowed to rise and set at room temperature or with the application of heat, dependent on the curing requirements for the polyurethane system employed.

Dyes, pigments, inert filler materials, perfumes, cosmetics, drugs, antiseptics, bactericides, detergents, and other material may be included within the matrix-forming polymeric material prior to the foaming operation. Alternatively, such materials may be incorporated into the cellular mass during or after the foaming operation. Such adjuvants or additives may be introduced for various purposes, such as to incorporate an additional functional agent within the body of the cellular mass or to modify the absorptive properties thereof. For example, such hydrophilic materials as fibers or filaments, of cotton, α-cellulose derived from wood pulp, and rayon either of viscose or cuprammonium cellulose derivation may be introduced to increase the softness and absorptive capacity or to increase the tensile strength of the matrix.

The products can be formed directly in the form ultimately desired; alternatively, they may be formed in larger masses and then cut to the desired size and shape. The formation may be effected in stationary molds or continuously, such as by extrusion to form rods, tubes, or slabs. They may be cast upon various substrates to form laminar products or coated products. In any case, they are of low density, high porosity, and exhibit high ion exchange capacity when considered in terms of the amount of ion exchange resin incorporated.

As pointed out hereinabove, the products of the present invention provide ion exchange materials in an improved system. By supporting ion exchange particles in the wall surfaces, reduction in the rate of exchange that occurs with loose resin particles because of packing during use in a column is avoided. By varying the proportions between ion exchange resin and matrix-forming polymeric material and by properly selecting the particular resin and polyether material used in any combination, a wide range of ion exchange capacities and rates are obtainable. Also by using mixtures of several types of ion exchange resins in any desired distribution in the poly(ether-urethane) material mixed-beds of ion exchange resin foams are obtainable. The products of the present invention are thus quite versatile in nature. Because the matrix is quite hydrophillic, the rate of ion exchange is frequently substantially higher than that obtainable with the corresponding ion exchange resin in loose bead form. Likewise, the rate of ion exchange can be increased even more by the expedient of alternate compression and release of the resilient ion exchange products of the present invention.

The cellular ion exchange products are useful in any situation where ion exchange resins find utility. They are capable of regeneration in customary fashion after their capacity has been exhausted so they are useful in systems wherein they must be repeatedly used and regenerated. On the other hand, they may also be employed as expendable or disposable articles wherein they are discarded after serving one use. The cellular products of the present invention are useful as surgical dressings, sanitary napkins, tampons, and catamenial pads. They also serve as deodorant pads, dress shields, and the like. For all of these uses which may be broadly termed sanitary uses, they may be initially formed in the proper shape or they may be cut to shape from a larger mass thereof. In such uses which involves absorbency, it is generally preferable to have the matrix formed of a hydrophilic material. The use of cellulose fiber fillers is also advisable to increase softness and absorbency. The product may be employed as a filler in a surgical dressing, catamenial pad, or the like, in which it may be disposed within a sheath of gauze or other protective material. The cellular products of the present invention may be formed into thin sheets which may be fashioned into suitable form to serve as the lining in clothing, particularly for the purpose of protection of the body of the wearer against exposure to toxic gases or vapors which may be present in the air in emergency situations, such as may at times occur in chemical factories, fires, or chemical warfare. The cellular materials are also useful as filters not only for liquids but for gasses, and they may be shaped into any suitable form or size for use therein particularly for scavenging acidic or basic gasses. Cleaning sponges formed of the cellular products of the present invention are quite generally applicable and have particular value in the cleaning-up of spillages of acidic or basic character and also of radio-active types. The cellular products of the present invention are also useful as linings for caps or lids of containers in which various chemical substances are stored. In such situations, they serve to absorb volatile acidic or basic constituents from the atmosphere within the container above the contents and thereby extend the shelf-life thereof. Bathing sponges formed of the cellular articles of the present invention, which may or may not contain a soap or other detergent, are particularly useful in hard water areas and serve to soften the water brought into contact with the body of the person by the sponge. After use, the sponge brought can then be reconditioned for the next bath by repeatedly squeezing in a sodium chloride solution. The instant cellular products are also useful in non-liquid and non-aqueous systems as by dispersing in paste, ointments, and the like.

In the following examples, which are illustrative of the present invention, parts and percentages are by weight unless otherwise specifically noted.

*Example I*

(a) To 100 parts of a polypropylene glycol prepolymer (prepared by heating at 100° C. and stirring for two hours a mixture of 100 parts polypropylene glycol, M.W. 2,000, and 35 parts of toluene-diisocyanate—80/20 ortho-para isomer mixture) is added 67 parts of a finely divided (100–200 mesh Tyler Standard Screen) nuclear sulfonic acid ion exchange resin (sulfonated styrene/8.5% divinyl benzene copolymer, prepared in accordance with U.S. Patent 2,366,007) in the sodium salt form and mixing is effected until homogeneous. Then a mixture of 2.4 parts water, 1.0 part N-methyl morpholine, 1.0 part triethylamine, and 0.6 part of a dimethylpolysiloxane silicone oil (DC-200–50 centistrokes) is added and mixed in until foaming began. The foaming mix is poured into an open mold and allowed to foam undisturbed to full height. The product has a density of 7.5 pounds per cubic foot and a capacity of 13,650 milliequivalents per cubic foot.

(b) Instead of using 67 parts of the resin used in (a), there is used 100 parts of a finely divided cation exchange resin (a sulfonated product of a soluble linear coploymer of dicyclopentadiene and maleic anhydride) as described in U.S. 2,731,426 to give a cation exchange cellular foam.

The cation exchange foam obtained is converted to the sodium salt form by alternative compression and decompression in a 4% sodium hydroxide solution in water for about 15 minutes. It is then converted by a similar flexing in a 20% calcium chloride solution to the calcium salt form. This product is rinsed with water and while still wet is placed at rest in a 0.1 N aqueous silver nitrate solution wherein it is converted to the silver salt form, equilibrium being approached in approximately one hour. A corresponding amount of the calcium salt form of the 100 to 200 mesh beads of the same ion exchange resin as that used in making the cellular product is placed in a 0.1 N aqueous silver nitrate solution. It is found that the loose resin beads required about 15 hours to approach equilibrium.

Samples of the foams prepared in accordance with examples I(a) and I(b) are immersed in a 0.8 and a 2.0 normal sodium hydroxide solution for 30 days. During that time, the foams are repeatedly flexed, compressed and released. After 30 days, no evidence of loss of tensile strength is observed.

Another group of samples of foams prepared in Examples I(a) and I(b) are heated to 240° F. for four hours at 100% relative humidity in a pressure cooker. Subsequent examination of the samples revealed only insignificant loss of compression modulus compared to ion exchange foams prepared from polyesters.

*Example II*

(a) To 100 parts of a polyoxalkylene polyol prepared by a sequential addition of propylene and ethylene oxides to ethylenediamine (having about 15% oxyethylene units and a molecular weight of about 3,500) there is added 85 parts of a finely divided (100–200 mesh) quarternary ammonium chloride ion exchange resin, (methacrylic acid/5% divinylbenzene copolymer—U.S. Patent 2,340,111) and mixing is effected until homogeneous. The product is then placed into a continuous foam producing machine and blended with 12.7 parts of toluene diisocyanate (80% 2,4-isomer–20% 2,6-isomer), 1.0 part of water, and 0.4 part of 1,4-diazobicyclo-2,2,2-octane catalyst is admixed. The toluene diisocyanate is supplied to the mixing chamber by a line separate from that used for the resin mixture and the water and catalyst are supplied as a mixture from a separate line. This foam mix is continuously ejected from the mixing chamber into an open mold and allowed to foam to full height. The foam has a density of 4 lbs./cubic ft. and a capacity of 2100 milliequivalents per cubic ft.

(b) The functionality of the polyether used for foaming the matrix of the above ion exchange foam is decreased to about 3.5 by using 100 parts of a blend of three parts of the polyether described above with one part of a difunctional polyether which is a block polymer consisting of blocks consisting of propylene and ethylene oxides (polyoxyalkylene compounds of the type described in U.S. Patent 2,674,619).

*Example III*

A strongly basic anion exchange foam is prepared by first mixing 15% of an insoluble anion exchange resin prepared by reacting a tertiary amine with an insoluble cross-linked polymer of a glycidyl ester of acrylic acid (as described in U.S. Patent 2,630,427) with 100 parts of a polyether blend. This polyether blend is a mixture of one part of a tetrafunctional polyoxyalkylene glycol prepared from propylene and ethylene oxides using ethylene-diamine as the starting nucleus and one part of a similar polyether but having a functionality of about 6 by using pentamylenehexamine as the starting nucleus. The final functionality of this blend is about 5. Into this blend there is admixed 22 parts of toluene diisocynate, one part of water, and 0.4 part of 1,4-diazobicyclo-(2,2,2-octane). The mixture is poured into an open tray and allowed to foam undisturbed to full height. The product is flexible and soft.

*Example IV*

(a) An anion exchange foam is prepared in the following manner. There are admixed 0.7 part of a finely divided (100–200 mesh) weak base ion exchange resin (obtained by the condensation of a bisphenol-methane formaldehyde and diethylene triamine in accordance with U.S. 2,356,151) with 100 parts of a polyether having a functionality of 3. This polyether is a blend of 18.2 parts of polyether used in Example II(a) and 31.8 parts of the polyether used in Example I. To one hundred parts of this blend there are admixed 31 parts of toluene diisocyanate, 2.1 parts of water, and 0.5 part of a water-soluble organosilicone and 0.5 part of the catalyst 1,4-diazobicyclo-(2,2,2-octane). The mix is poured into an open mold and allowed to foam undisturbed to a full height. The product has a capacity of 60 milliequivalents per cubic foot and a density of 3.0 pounds per cubic foot.

(b) A cation exchange foam is prepared by following the same procedure by substituting 30 parts of a strongly acidic cation exchange resin (obtained by reacting phosphorus trichloride and acetic acid with an insoluble cross-linked copolymer of methyl vinyl ketone with divinylbenzene, in accordance with U.S. Patent 2,837,488). The cellular foam is useful in applications where a greater acidity than that of a carboxylic exchanger and lesser acidity than that of a sulfonic exchanger is needed.

*Example V*

An anion exchange foam is prepared in the following manner. One hundred parts of the polyether used in Example II(a) is pre-reacted with 35 parts of toluene diisocyanate at 100° C. for two hours. To 100 parts of the resulting prepolymer there is admixed 16 parts of a finely divided (100–200 mesh) strong base ion exchange resin (chloromethyl- and trimethylamine quaternized styrene/5% divinylbenzene copolymer prepared in accordance with U.S. Patent 2,591,573). Into this mixture there are metered 2.2 parts of water, 0.46 part of a water-soluble organisilicone, and 0.65 part of 1,4-diazobicyclo(2,2,2-octane) catalyst. The mix is ejected continuously into a cylindrical container and allowed to foam to a density of 2.2 lbs. per cubic foot. The foam has a capacity of 480 milliequivalents per cubic foot.

*Example VI*

To 100 parts of a polyoxyalkylene glycol block polymer prepared from propylene and ethylene oxides using ethylenediamine as the starting nucleus, there are added 150 parts of a nuclear sulfonic acid ion exchange resin in the acid form. Toluene diisocyanate, water, and catalyst are admixed in accordance with the procedure described above. The foam is allowed to rise to full height giving a cation exchange foam of a high order of ion exchange capacity.

The foam is immersed into a 2.0 normal sodium hydroxide solution for 30 days. It is flexed (repeated compression and relaxation). No loss of tensile strength is observed.

*Example VII*

A cation exchange foam is prepared by admixing 70 parts of a cation exchange resin (obtained by reacting methyl ketone with an acrylic ester-divinylbenzene copolymer, in accordance with U.S. 2,613,200). The foam is prepared by the general procedure of Example VI. The foam is shaped into a cylindrical column which is useful in adsorption of streptomycin from fermenation broths.

It is to be understood that changes and variations may be made without departing from the spirit and scope of the invention as defined in the appended claims.

We claim:

1. As an article of manufacture, a matrix of polymeric material containing intercommunicating cells distributed throughout its mass and particulate ion exchange resins distributed in the walls between such cells, said polymeric matrix being a foamed poly(ether-urethane) which is the reaction product of an organic polyisocyanate with a polyether resin having an hydroxyl functionality in the range of 2.0 to about 6.0, the amount of such ion exchange resin being from 0.5 to 160 parts by weight per 100 parts by weight of foamed polymeric material other than the ion exchange resin forming the matrix, said article being flexible, resilient, and having a density of not over 20 pounds per cubic foot and being permeable to both gases and liquids, whereby the ion exchange resin is readily available to liquids introduced into the matrix.

2. As an article of manufacture, a matrix of hydrophilic polymeric material containing intercommunicating cells distributed throughout its mass and particulate ion exchange resins distributed in the walls between such cells, said polymeric matrix being a foamed poly(ether-urethane) which is the reaction product of an organic polyisocyanate with a polyether resin having an hydroxyl functionality in the range of 3 to about 4, the amount of such ion exchange resin being from 0.5 to 160 parts by weight per 100 parts by weight of foamed polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

3. As an article of manufacture, a matrix of hydrophilic polymeric material containing intercommunicating cells distributed throughout its mass and particulate ion exchange resins distributed in the walls between such cells, said polymeric matrix being a foamed poly(ether-urethane) which is the reaction product of an organic polyisocyanate with a polyether resin having an hydroxyl functionality of about 4, the amount of such ion exchange resin being from 0.5 to 160 parts by weight per 100 parts by weight polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

4. As an article of manufacture, a matrix of hydrophilic polymeric material containing intercommunicating cells distributed throughout its mass and particulate ion exchange resins distributed in the walls between such cells, said polymeric matrix being a foamed poly(ether-urethane) which is the reaction product of an organic polyisocyanate with a polyether resin having an hydroxyl functionality in the range of 3 to about 4, the amount of such ion exchange resin being from 15 to 150 parts by weight per 100 parts by weight of foamed polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

5. As an article of manufacture, a polymeric material containing intercommunicating cells extending through thin attenuated walls of the polymeric material and particulate ion exchange resins dispersed in the walls between such cells, said polymeric material being a foamed poly(ether-urethane) which is the reaction product of an organic polyisocyanate with a polyether resin having an hydroxyl functionality of 2 to about 6 and having a viscosity in the range of 5,000 to 50,000 centipoises (as measured on a Brookfield viscometer), the amount of such ion exchange being from 0.5 to 160 parts by weight per 100 parts by weight of foamed polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

6. As an article of manufacture, a polymeric material containing intercommunicating cells extending through thin attenuated walls of the polymeric material and particulate ion exchange resins dispersed in the walls between such cells, said polymeric material being a foamed poly(ether-urethane) which is the reaction product of an organic polyisocyanate with a polyether resin having an hydroxyl functionality of 2 to about 4 and having a viscosity in the range of 5,000 to 10,000 centipoises (as measured on a Brookfield viscometer), the amount of such ion exchange being from 0.5 to 160 parts by weight per 100 parts by weight of foamed polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

7. As an article of manufacture, a hydrophilic polymeric material containing intercommunicating cells extending through thin attenuated walls of the polymeric material and particulate ion exchange resins dispersed in the walls between such cells, said polymeric material being a foamed poly(ether-urethane) which is the reaction product of an organic polyisocyanate with a polyether resin characterized by an hydroxyl functionality from 2 to about 4 and 0 to about 16 terminal oxyethylene units per mole of initial reactive hydrogen atom, the amount of such ion exchange resin being from 0.5 to 160 parts by weight per 100 parts by weight polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

8. As an article of manufacture, a polymeric material containing intercommunicating cells extending through thin attenuated walls of the polymeric material and particulate ion exchange resins homogeneously dispersed in the walls between such cells, said polymeric matrix being a foamed poly(ether-urethane) which is the reaction product of an organic polyisocyanate with a polyether having an hydroxyl functionality in the range of 3 to 4, said polyether comprising a hydrophilic and a hydrophobic portion, the hydrophilic portion comprising 10 to 65% of oxyethylene units based on the average molecular weight of the hydrophobic portion and a hydrophobic portion comprising the remainder of the polyether, the amount of incorporated ion exchange resin being from 15 to 150 parts by weight per 100 parts by weight polymeric material other than ion exchange resin forming the matrix, said article being flexible, resilient and having a density of not over 20 pounds per cubic foot and being permeable to both gases and liquids, whereby the ion exchange resin is readily available to liquids with which the matrix is contacted.

9. The article of claim 8 in which there are 10 to 50% oxyethylene units as hydrophilic portion in the polyether.

10. The article of claim 8 in which ion exchange resins have an ion exchange capacity of a minimum of 3 milliequivalents per gram of resin.

References Cited in the file of this patent

UNITED STATES PATENTS

| 2,608,536 | Sterling | Aug. 26, 1952 |
| 2,634,244 | Simon et al. | Apr. 7, 1953 |

FOREIGN PATENTS

| 510,243 | Great Britain | July 28, 1939 |
| 731,071 | Great Britain | June 1, 1955 |